United States Patent [19]

Nagai

[11] Patent Number: 4,471,206

[45] Date of Patent: Sep. 11, 1984

[54] METHOD OF SEALING VACUUM BOTTLE EVACUATION CHAMBERS

[75] Inventor: Kiyoshi Nagai, Nishinomiya, Japan

[73] Assignee: Taiyo Sanso Co., Ltd., Japan

[21] Appl. No.: 426,456

[22] Filed: Sep. 29, 1982

[30] Foreign Application Priority Data

Mar. 11, 1982 [JP] Japan ................................. 57-39210

[51] Int. Cl.³ ............................................. B23K 15/00
[52] U.S. Cl. .................. 219/121 ED; 53/86;
 219/121 EG; 219/121 EM
[58] Field of Search ............... 219/121 EC, 121 ED,
 219/121 EB, 121 EM, 121 LC, 121 LD;
 228/221; 53/405, 408, 404, 86, 80, 83, 89

[56] References Cited

U.S. PATENT DOCUMENTS

| | | | |
|---|---|---|---|
| 3,423,817 | 1/1969 | Bobo | 53/86 X |
| 3,835,618 | 9/1974 | Perdue | 53/86 X |
| 3,926,306 | 12/1975 | Van Nederveen | 53/86 X |
| 4,251,252 | 2/1981 | Frazier | 228/221 X |

FOREIGN PATENT DOCUMENTS 645871  6/1937  Fed. Rep. of Germany ........ 53/404

*Primary Examiner*—C. L. Albritton
*Attorney, Agent, or Firm*—Griffin, Branigan & Butler

[57] ABSTRACT

A method of evacuating and sealing the vacuum chamber of a stainless steel vacuum bottle includes the steps of piercing the outer bottle with only very small openings into the vacuum chamber and closing the openings by means of an electron-beam welder after the bottle is heated and the vacuum chamber evacuated.

8 Claims, 5 Drawing Figures

FIG. 2
FIG. 3
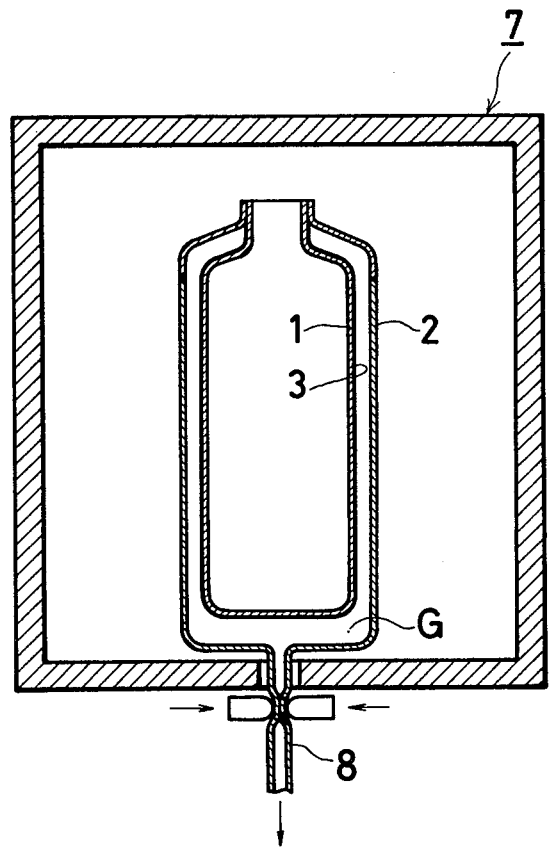
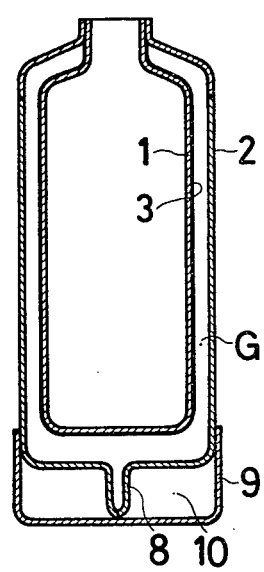

METHOD OF SEALING VACUUM BOTTLE EVACUATION CHAMBERS

BACKGROUND OF THE INVENTION

This invention relates to a method of evacuating and sealing the vacuum chamber of a vacuum bottle and, more particularly, a method of evacuating and sealing such chambers in metal vacuum bottles having reflective surfaces on the vacuum chamber walls.

Vacuum bottles customarily include a first bottle spaced from a second bottle with only minimal contact therebetween in order to reduce conductive heat loss. The outer surface of the inner bottle and/or the inner surface of the outer bottle are usually coated with a reflective film or membrane so that the thusly "reflectorized" or "silvered" surfaces will cause the reflection of radiation and reduce radiation heat loss. Additionally, the chamber between the two bottles is evacuated in order to reduce gas conduction to or from the contents of the inner bottle.

The inner and outer bottles are often made of stainless steel which is sometimes nickel-plated prior to application of the reflectorized layer such as by the vapor-deposition of silver. The bottle is then heated in a furnace for one to two hours at a temperature of about 600 degrees centigrade in a furnace that is evacuated to about $10^{-4}$–$10^{-5}$ torr. In this manner, the bottle's vacuum chamber surfaces are "out-gased" and the vacuum chamber is evacuated to near the vacuum of the furnace itself. In this respect, a 20 mm–30 mm hole is conventionally cut into the outer bottle during the heating and evacuating process in order to permit the gases in the bottle's vacuum chamber to be drawn out of the chamber and through the evacuated furnace.

After the chamber is evacuated the hole in the outer bottle must be sealed. Such sealing, however, customarily includes a relatively high-temperature soldering step at as much as 700° C.–800° C., which tends to damage the reflectorized surfaces. In this regard, silver has relatively poor heat resistance and its reflective and adhesive abilities begin to deteriorate at temperatures of between 600° C. and 650° C. Accordingly, particularly if it is a silver film that is deposited on the bottle's evacuation chamber surfaces, the resulting damage reduces the bottle's ability to prevent radiation heat loss. It is an object of this invention, therefore, to provide a method of sealing the vacuum chamber in a manner which reduces damage to the reflectorized surfaces.

Conventional methods described above require strict control of the duration and temperature of the soldering step. In this regard, flux cannot normally be used when soldering in a vacuum; and, the conventional 20 mm–30 mm openings provide a relatively large surface that must be soldered. Consequently, the above-described method requires closely-controlled, time-consuming operations. Advantages of the method of the instant invention, however, result in a more rapid operation that need not be as closely controlled. Hence, the method of the invention is more efficient and less costly.

Another conventional method of sealing the evacuation chamber includes the use of a pinch-pipe for connecting the vacuum chamber to a source of vacuum external of the furnace. In this method the pinch-pipe is pressed or otherwise pinched closed after evacuation and then cut off outside of the furnace prior to being sealed with solder. In this method, a flux can be used and the soldering temperature can be as high as 700° C. without too much damage to the silvered surfaces. The pipe, however, extends outwardly from the bottom of the bottle and must be covered in order to protect the seal and give the bottle a stable surface. This, however, not only increases the cost of the vessel, but makes it taller and more bulky so as to reduce the percentage of the overall structure that can be used for storage of contents. Another advantage of the instant invention, therefore, is that pinch-pipes are not required and the costly, bulky pinch-pipe covers are also eliminated.

SUMMARY OF THE INVENTION

According to principles of the invention, the outer bottle is pierced by only very small openings into the vacuum chamber. Then, after the bottle is heated and the vacuum chamber evacuated, the small openings are closed by an electron-beam welder. In this manner, the integrity of the reflective surfaces is maintained; the closing step is swift; an acceptable vacuum is nevertheless obtained and maintained in the vacuum chamber; and, no bulky, expensive, pinch-pipe covers are required.

BRIEF DESCRIPTION OF THE DRAWINGS

The foregoing and other objects, features, and advantages of the invention will be apparent from the following more specific description of preferred embodiments of the invention, as illustrated in the accompanying drawings in which reference characters refer to the same parts throughout the different views. The drawings are not necessarily to scale, emphasis instead being placed upon illustrating principles of the invention in a clear manner.

FIG. 2 is a diagrammatic illustration of another conventional method of evacuating and sealing a vacuum bottle;

FIG. 3 is a vertical cross-sectional diagrammatic view of a vacuum bottle resulting from the method of FIG. 2;

DESCRIPTION OF PREFERRED EMBODIMENTS

Figure 1:
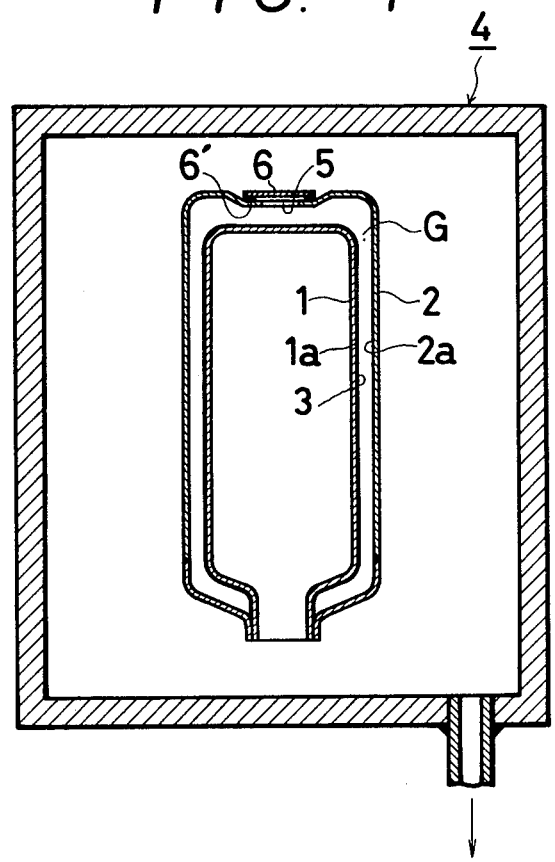
FIG. 1 is a diagrammatic illustration of a conventional method of evacuating and sealing a vacuum bottle.

Metal vacuum bottles often have the inner and outer bottles, 1 and 2 respectively in FIG. 1, made of stainless steel. In this respect, the outer surface 1a of the inner bottle 1 and/or the inner surface 2a of the outer bottle 2 are often nickel-plated and then silver plated either by a typical plating process or a vapor-deposition process in order to form a membrane or film of reflective material 3 for reducing radiation heat loss.

As noted above, such bottles are often heated in an evacuated furnace 4. The furnace is customarily held at a temperature of about 600° C. and maintained at a vacuum of about $10^{-4}$–$10^{-5}$ torr. The bottles are thusly heated for one-two hours or so so that the bottle walls are outgased and the evacuation chamber G between the bottle walls is evacuated through a hole 5 that is cut into the bottom of the bottle.

The diameter of the opening 5 has been made relatively large—20 mm–30 mm— to facilitate evacuation of th evacuation chamber G as nearly as possible to the vacuum in the furnace 4 and to shorten the bottle's required heating time.

After a suitable heating and evacuation period a lid 6 is soldered onto the opening 5 in order to maintain the chamber G's vacuum after the bottle is removed from the evacuated furnace 4. The soldering step, however, requires temperatures of about 700° C.–800° C.; and, tends to damage the reflective surfaces 1a and 2a so as to reduce the structure's ability to limit radiation heat losses. In this respect, the damage is particularily troublesome if silver is used as the reflective surface, because silver is damaged at temperatures only slightly above 600° C. That is, silver has relatively poor heat resistance so that its reflectivity deteriorates along with its adhesion onto the stainless steel or nickel substrate. Moreover, this problem of silver deterioration is particularly serious because silver has such reflective ability as opposed to other coating materials that it is silver that is commonly used to prevent radiation heat losses.

The silver deterioration is particularly troublesome on the inner surface 2a of the outer bottle 2. Accordingly, since this is the largest surface area of the two bottles, soldering temperatures must be strictly controlled when the reflective surfaces 1a and 2a are of silver.

Additionally, fluxes are not normally used when the soldering occurs in a vacuum. These factors, coupled with the relatively large diameter of the opening 5, therefore, make the soldering operation quite difficult. Consequently, although the abovedescribed method is relatively common; the productionefficiency is poor; the soldered joint is not as airtight as desired; and, the deterioration of the reflective surfaces results in greater-than-desired radiation heat losses.

The method illustrated in FIG. 2 is often used to reduce the first method's soldering prolems. Therein, the furnace 7 and the bottle therein are heated to about 600° C. A pinch pipe 8 is connected to the outer bottle, however, so that the vacuum chamber G can be evacuated through the pinch tube 8 which extends outside of the furnace 7.

After evacuation the pipe 8 is conventionally pressed or otherwise pinched together as shown. The portion of the pinch pipe 8 that is external of the pinch is then cut off and soldered. This method has the advantage that soldering temperatures of as high as 700° C. can be used without too much damage to the silvered or otherwise reflectorized surfaces; and, flux can be used during the soldering operation.

The structure resulting from the method described in connection with FIG. 2 has a natural drawback, however, in that the remaining soldered portion of the pinch pipe 8 must be protected by a cover such as 9 (FIG. 3). This cover not only adds to the cost of the resulting vacuum bottle, but is also bulky in that it adds the voluum 10 which undesirably increases the overall size of the vacuum bottle.

Figure 4:
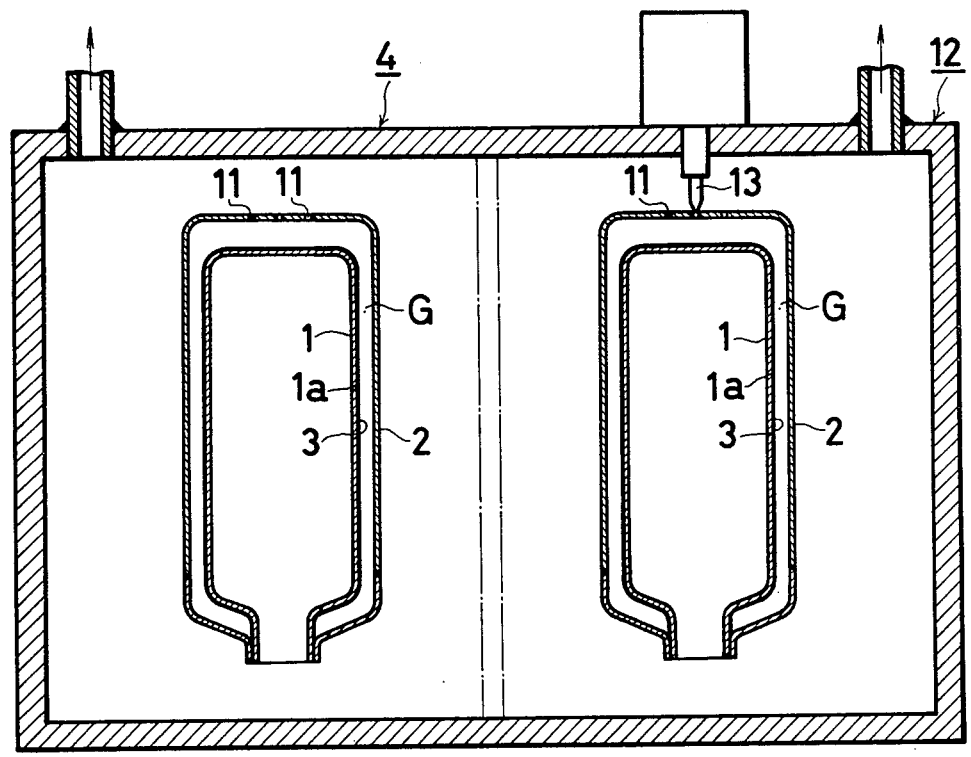
FIG. 4 is a diagrammatic illustration of a method according to the invention.
Figure 5:
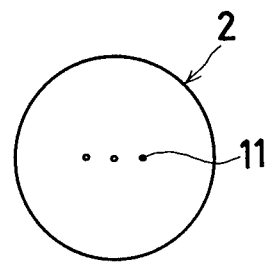
FIG. 5 is a diagrammatic illustration of the bottom of an outer bottle used in the performance of the method illustrated in FIG. 4.

In connection with the instant invention a considerable testing program was conducted to determine correlations between the size and number of openings, and the rate at which the vacuum in chamber G was developed during heating in the evacuated furnace 4. Those tests showed that improved-performance vacuum bottles can be obtained without either the large hole 5 or the pinch tube 8. In this respect, it has been found that the chamber G can be rapidly evacuated even though the outer bottle 2 is pierced as at 11 (FIGS. 4 and 5) by only a small hole or holes. In fact, it has been found that holes as small as 0.3 mm–1.0 mm in diameter can be used without increasing the time for the chamber G to be evacuated to about the same level of vacuum as is obtained through the methods illustrated in FIGS. 1 and 2. As illustrated in FIGS. 4 and 5, for example, 2 or 3 0.3 mm–1.0 mm diameter holes permitted the chamber G to be evacuated to about the level of vacuum in the furnace 4 in the same length of time as the 20 mm–30 mm diameter opening of FIG. 1.

In one embodiment the outer and inner bottles 1 and 2 were made of 0.5 mm thick SUS 304 stainless steel. The stainless steel was nickel plated and a layer of silver such as 3 was deposited on the nickel-plated surfaces so that they would be reflectorized. Three small openings 11 (0.3 mm–0.5 mm in diameter) were pierced in the bottom portion of the outer bottle 2 as shown in FIGS. 4 and 5.

The thusly plated bottles 1 and 2 were then assembled as shown and heated in a furnace 4 at a temperature of 580° C.–600° C. for 30–60 minutes at a vacuum of $10^{-4}$–$10^{-5}$ torr.

Other examples falling within the above time-temperature-vacuum limits included as many as 5 0.3mm–0.5 mm diameter openings 11.

In each case the heated, evacuated bottles were then moved into an adjoining evacuated apparatus 12 where the small openings 11 in the bottoms of the outer bottles 2 were closed by an electron-beam welder 13 extending into the evacuated apparatus 12. In this regard, the apparatus 12 and the furnace 4 were separated from each other, but the vacuums in the two were the same. Hence, the electron-beam welder 13 could just as easily have been placed in the furnace 4.

The electron-beam welder 13 was of the conventional type employed in precision machinery except that the gun portion included a device for maintaining the vacuum-integrity of the evacuated apparatus 12 where the electron-beam welder 13 extended into the apparatus 12.

The diameter of the inner wall of the the above-described embodiments was 100 mm and the diameter of the outer bottle was 121 mm. Inasmuch as the walls were 0.5 mm thick, the space between the inner and outer bottles was 10 mm and, the height was such that the capacity of the vacuum bottles was 2.2 liters.

In "comparison" bottles about to be described, only the outer surface 1a of the inner bottle 1 was nickel and silver plated; and, 3 0.5 mm diameter openings 11 were employed.

The vacuum in the furnace 4 was $10^{-5}$ torr; and, the vessels were maintained in the heated, evacuated furnace for an hour prior to being moved to the evacuated apparatus 12 which was also maintained at a vacuum of $10^{-5}$ torr. At that time the vacuums in the chambers G were between $10^{-4}$ and $5 \times 10^{-4}$ torr. The three small openings 11 were then sealed by electron-beam welder 13.

"Standard" bottles manufactured in accordance with the FIG. 1 method had an opening 5 of 20 mm in diameter instead of the small holes 11.

The "standard" structures were evacuated and heated in the same manner as for the comparison embodiments and the lids 6 were then soldered on using silver solder having a melting point of 650° C.–700° C.

The resulting vacuum in the space G was essentially the same as for the comparison bottles.

The insulation qualities of the standard and comparison bottles were then compared by placing 95° C. water in each of them for a period of 24 hours. At the end of that time the bottles sealed by the method of the present invention had maintained their contents at between 62° C. and 64° C. while the standard bottles had only maintained their contents at between 60° C. and 61° C. In this regard, the small superiority of the method of the invention results from the lack of damage to the silver layer 3 which leads to the reduction in the radiation heat losses obtained by the method of the invention.

Additionally, the present invention provides a sealing operation that is far more efficient than conventional silver soldering methods. In this regard, the electron-beam welder is about five-to-eight times as efficient as conventional silver soldering methods. Moreover, conventional silver soldering techniques sometimes result in such damage that the resulting product must be rejected. Accordingly, the method of the invention is additionally desirable for this reason. Still further, because of the small size of the holes, the instant invention leaves a smaller area for leaks to occur in the vacuum so that the vacuum lasts longer.

The embodiments of the invention in which an exclusive property or privilege is claimed are defined by the following:

1. A method of sealing the evacuation chamber of a vacuum bottle wherein said vacuum chamber is bounded by walls of spaced apart inner and outer bottles, said method comprising the steps of:

assembling said inner and outer bottles to form said evacuation chamber and piercing at least one small openings through said outer bottle and into said evacuation chamber;

heating the assembled inner and outer bottles inside an evacuated furnace; and, sealing said pierced holes with an electron-beam welder while the vacuum is maintained in said evacuated chamber.

2. The method of claim 1 including the step of applying a coating of silver to surfaces of said vacuum chamber.

3. The method of claim 1 or claim 2 wherein said small openings are provided in the bottom portion of said outer bottle.

4. The method of claims 1 or 2 wherein said small openings are between about 0.3 mm and 1.0 mm in diameter.

5. The method of claim 1 wherein at least three but no more than five of said holes are pierced in said outer bottle.

6. The method of claim 3 wherein said small openings are between about 0.3 mm and 1.0 mm in diameter.

7. The method of claim 3 wherein at least three, but no more than five of said holes are pierced in said outer bottle.

8. The method of claim 4 wherein at least three, but no more than five of said holes are pierced in said outer bottle.

* * * * *